(12) United States Patent
Peterson et al.

(10) Patent No.: US 12,192,050 B2
(45) Date of Patent: *Jan. 7, 2025

(54) MULTIPLE COMMUNICATION MODES AND NETWORK SERVICES IN A SELF-CONTAINED UNIT

(71) Applicant: Fenix Group, Inc., Chantilly, VA (US)

(72) Inventors: David Peterson, Haymarket, VA (US); Stefan Schaner, Ashburn, VA (US); Taylor Thompson, Chantilly, VA (US); Bryan Coxwell, Chantilly, VA (US); Aaron Hoogland, Centerville, VA (US)

(73) Assignee: Fenix Group, Inc., Chantilly, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/519,975

(22) Filed: Nov. 27, 2023

(65) Prior Publication Data

US 2024/0179046 A1 May 30, 2024

Related U.S. Application Data

(63) Continuation of application No. 18/057,666, filed on Nov. 21, 2022, now Pat. No. 11,870,640, which is a continuation of application No. 17/092,548, filed on Nov. 9, 2020, now Pat. No. 11,509,521.

(60) Provisional application No. 62/969,286, filed on Feb. 3, 2020.

(51) Int. Cl.
*H04W 4/00* (2018.01)
*H04B 1/3883* (2015.01)
*H04L 41/0668* (2022.01)
*H04L 49/351* (2022.01)
*H04W 36/30* (2009.01)
*H04W 36/14* (2009.01)
*H04W 84/04* (2009.01)
*H04W 84/18* (2009.01)

(52) U.S. Cl.
CPC ....... *H04L 41/0668* (2013.01); *H04B 1/3883* (2013.01); *H04L 49/351* (2013.01); *H04W 36/305* (2018.08); *H04W 36/142* (2023.05); *H04W 84/042* (2013.01); *H04W 84/18* (2013.01)

(58) Field of Classification Search
None
See application file for complete search history.

(56) References Cited

U.S. PATENT DOCUMENTS 8,385,269 B2 2/2013 Haddad
10,693,813 B1 6/2020 Jacob Da Silva et al.
10,715,411 B1 7/2020 Jacob Da Silva et al.
(Continued)

*Primary Examiner* — Bob A Phunkulh
(74) *Attorney, Agent, or Firm* — Polsinelli PC

(57) ABSTRACT

Disclosed are systems and methods for a self-contained multi-modal communication system. The multi-modal communication system comprises a first mobile telecommunication node, which provides a private telecommunication network, a layer 2 (L2) backhaul wireless transceiver, an ethernet switch and an embedded edge cloud compute device. The edge cloud compute device includes an automatic failover detection system, wherein the automatic failover detection system receives as input a plurality of network parameters and automatically performs failover and communication modality switching for one or more communication devices associated with the self-contained multi-modal communication system.

20 Claims, 11 Drawing Sheets

(56) References Cited

U.S. PATENT DOCUMENTS

| | | |
|---|---|---|
| 11,336,508 B2* | 5/2022 | Efraim .................... H04L 41/40 |
| 11,341,862 B2 | 5/2022 | Tachiiwa |
| 2008/0162981 A1* | 7/2008 | Jajoo .................. H04L 41/0896 |
| | | 714/2 |
| 2016/0315848 A1 | 10/2016 | Weinstein |
| 2016/0371316 A1 | 12/2016 | Okanohara et al. |
| 2021/0067811 A1 | 3/2021 | Bates et al. |
| 2021/0135746 A1 | 5/2021 | Watson |
| 2022/0155080 A1 | 5/2022 | Zhang et al. |

* cited by examiner

MULTIPLE COMMUNICATION MODES AND NETWORK SERVICES IN A SELF-CONTAINED UNIT

CROSS-REFERENCE TO RELATED APPLICATIONS

This application is a continuation of U.S. application Ser. No. 18/057,666 filed Nov. 21, 2022, which is a continuation of U.S. application Ser. No. 17/092,548 filed Nov. 9, 2020, which claims the benefit of priority to U.S. Provisional Application No. 62/969,286 filed Feb. 3, 2020 the disclosures of which are herein incorporated by reference in their entirety.

TECHNICAL FIELD

The present disclosure pertains to the incorporation of multiple communication modes and network services in a single self-contained unit, and more particularly pertains to a single device that is capable of hosting and operating network services and multiple communications devices which transmit and receive over various communication modalities.

BACKGROUND

Natural disasters, humanitarian crises, war, and underserved people in rural environments all suffer from a lack of reliable communications. Without an ability to communicate and send data, logistics and information flow slows considerably, crippling decision making & logistics during times of crisis. Recent weather events in Puerto Rico, St. Maarten, and wars throughout the world have left huge populations without the ability to communicate, making recovery and rebuilding efforts difficult.

A primary focus of emergency preparedness is communication availability and reliability at the edge. Unpredictable weather patterns and unexpected environmental conditions may have an adverse impact on communications for first responders and volunteers, making reach-back to cloud services unreliable. By possessing and planning on using varying communication systems which transmit and receive over differing communication modalities gives the communicator options to ensure reliable lines of communication are established. This can be described as communication redundancy with edge core services hosted on the endpoint device.

Communications redundancy also plays a crucial role in military operations. Military personnel must operate various forms of communications equipment to ensure audio and/or data connectivity are maintained in the event of a communications failure at the tactical edge. Should a communications failure occur, military communicators will progress through identified communications systems until contact has been established with the desired unit. These available communication systems differ in form factor, capability, and communication modality.

The variety of communications systems used may also require network services to bridge connectivity, monitor equipment and communication status, and provide much needed updates and repairs.

SUMMARY

Example embodiments of the disclosure provide systems and methods for providing communication redundancy in a portable, self-contained unit. In some embodiments, the portable, self-contained unit can comprise an enclosure containing the following primary components: an "Edge—Cloud" Compute Stack (to alleviate reliance on cloud services); an ethernet switch; a Layer Two Integrated Mobile Ad-hoc Network ("MANET") Radio; and a private mobile telecommunications node (2G, 3G, 4G, or 5G). In some embodiments, the portable, self-contained unit can further comprise one or more communication nodes, radios and/or transceivers for implementing additional communications networks, including but not limited to satellite communications and VLC (Visible Light Communication).

Other forms of wireless communication devices may be used in addition to or in replacement of the MANET radio, the private mobile telecommunication node, and/or the additional communication nodes. Such other forms of wireless communications devices may implement protocols including, but not limited to, IEEE 802.11, Bluetooth, serial wireless, etc. In some embodiments, an interposer board may be utilized in the portable, self-contained unit. For example, two LTE front ends may be attached directly to a specialized baseband card containing hardware configured to perform the same function as that of an interposer board functioning as a separate item.

Notably, the presently disclosed portable, self-contained unit implements multiple, secure communication networks and technologies from a single footprint, where conventional solutions require multiple, disparate systems and components in order to achieve a similar level of communications capabilities. Additionally, the self-contained unit of the present disclosure can be transported or otherwise repositioned as needed, i.e., by virtue of its portable and self-contained nature, which allows it to be installed in a backpack or vehicle, for example.

Moreover, the variety of different communications networks and/or protocols provided by the portable, self-contained system can each be hardened, private networks that are suitable for use in a wide range of scenarios, environments and conditions, including those which demand enhanced security and reliability. Additionally, according to aspects of the present disclosure, the portable, self-contained system can automatically perform intelligent, dynamic failover between its different private communication networks, optimizing the switching process to account for factors including, but not limited to: network availability, network conditions (e.g., signal-to-noise ratio, traffic/congestion, packet loss, latency, jitter, etc.), environmental factors and/or geographic location, mission parameters and requirements, bandwidth requirements, security requirements, area coverage requirements, power availability, etc.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only example embodiments of the disclosure and are not therefore to be considered to be limiting of its scope, the principles herein are described and explained with additional specificity and detail through the use of the accompanying drawings in which.

DETAILED DESCRIPTION

Figure 1:
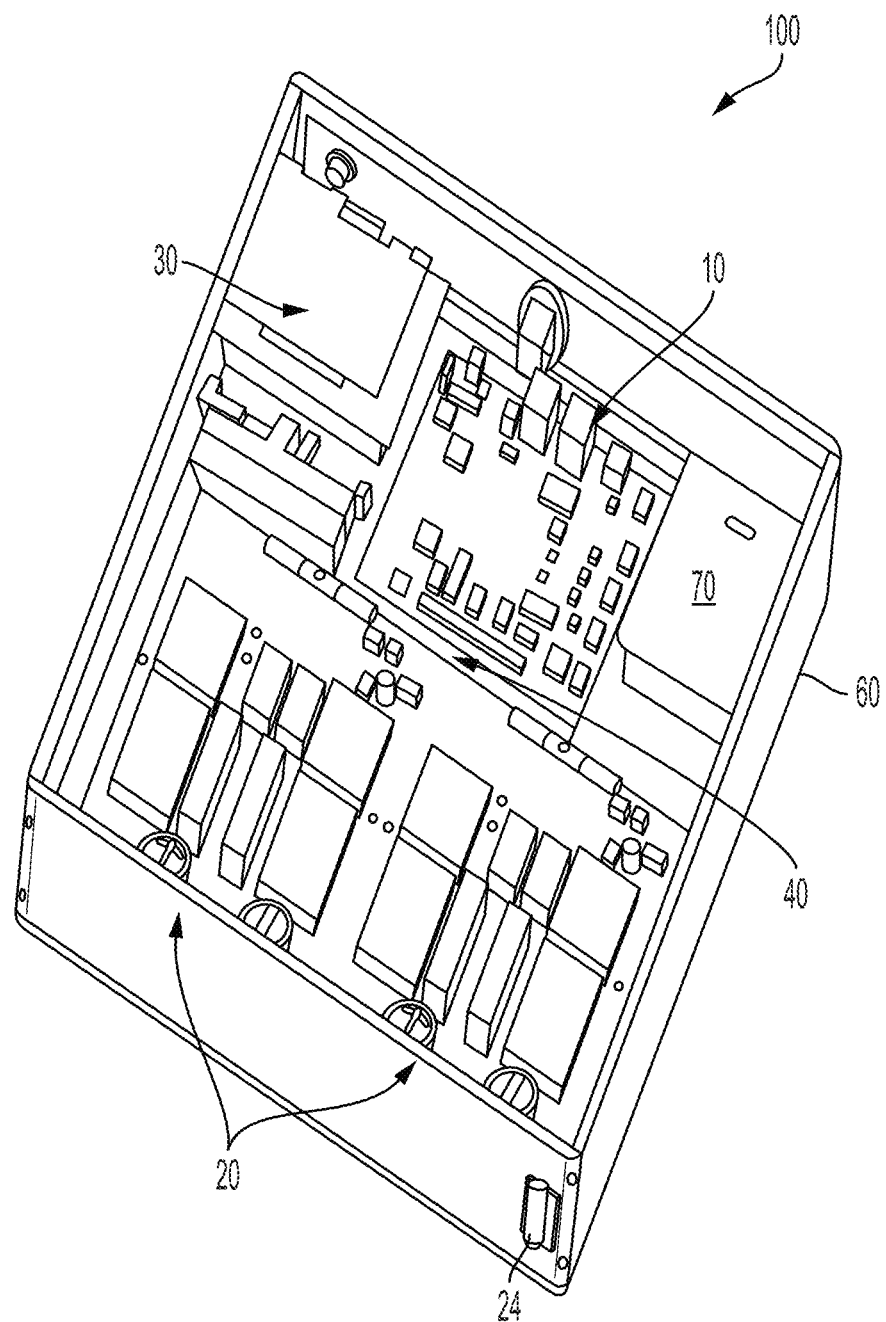
FIG. 1 depicts a perspective illustration of an example portable cellular base station, according to certain embodiments.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Additional features and advantages of the disclosure will be set forth in the description which follows, and in part will be obvious from the description, or can be learned by practice of the herein disclosed principles. It will be appreciated that for simplicity and clarity of illustration, where appropriate, reference numerals have been repeated among the different figures to indicate corresponding or analogous elements. The description is not to be considered as limiting the scope of the embodiments described herein. Aspects of the disclosure may be embodied in many different forms and should not be construed as limited to the example embodiments set forth herein. It should also be emphasized that the disclosure provides details of alternative examples, but such listing of alternatives is not exhaustive. Furthermore, any consistency of detail between various examples should not be interpreted as requiring such detail—it is impracticable to list every possible variation for every feature described herein.

It will be appreciated that the use of the same or similar reference numerals indicates the same or similar structure and thus associated description is typically relevant to all such same/similar structure. Use of suffixes for reference numerals (e.g., "a" for reference numeral "100-a") is used when several similar structures are provided and/or variations are implemented between similar structures. Generic use of a reference numeral without a suffix (e.g., just "100") may refer individually to all such structures (e.g., each of 100-1, 100-2 . . . 100-n).

In the drawings, different figures show various features of example embodiments, these figures and their features are not necessarily intended to be mutually exclusive from each other. Rather, certain features depicted and described in a particular figure may also be implemented with embodiment(s) depicted in different figures, even if such a combination is not separately illustrated. Referencing such features/figures with different embodiment labels (e.g. "first embodiment") should not be interpreted as indicating certain features of one embodiment are mutually exclusive of and are not intended to be used with another embodiment.

Unless the context indicates otherwise, the terms first, second, third, etc., are used as labels to distinguish one element, component, region, layer or section from another element, component, region, layer or section (that may or may not be similar). Thus, a first element, component, region, layer or section discussed below in one section of the specification (or claim) may be referred to as a second element, component, region, layer or section in another section of the specification (or another claim).

It will be understood that when an element is referred to as being "connected," "coupled to" or "on" another element, it can be directly connected/coupled to/on the other element or intervening elements may be present. In contrast, when an element is referred to as being "directly connected" or "directly coupled" to another element, or as "contacting" or "in contact with" another element, there are no intervening elements present.

Figure 2:
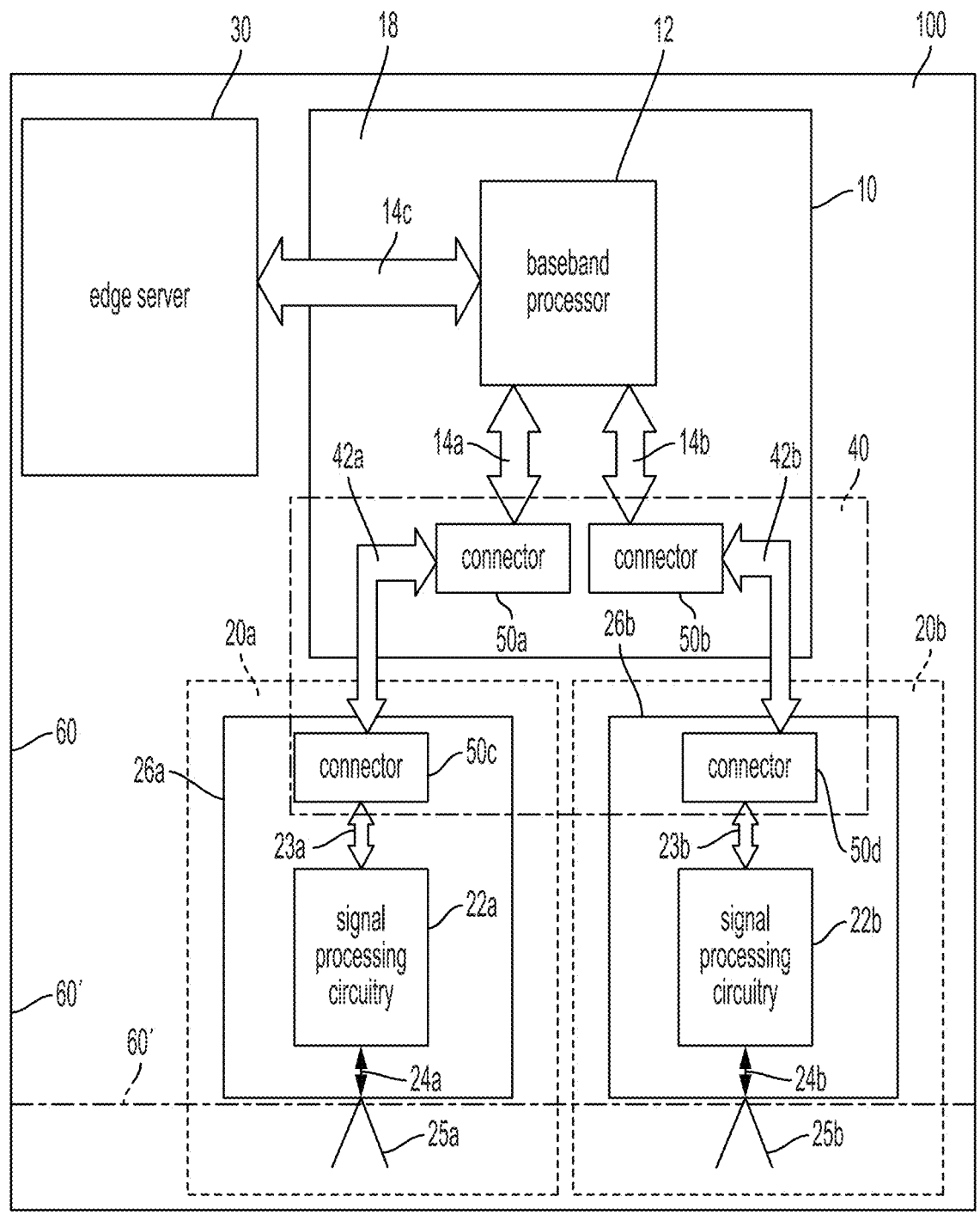
FIG. 2 depicts a block diagram of the example portable cellular base station of FIG. 1, according to certain embodiments.

The disclosure turns now to FIG. 1, which illustrates a perspective view of an example embodiment of a portable, self-contained multimodal communication system according to aspects of the present disclosure. FIG. 2 is an example block diagram of the portable, self-contained multimodal communication system. As illustrated, a cellular base station 100 comprises a baseband radio 10, a plurality of RF frontend modules 20, and an embedded edge server 30. The plurality of RF frontend modules 20 may each comprise a MIMO (multi-input multi-output) RF transceiver and may operate at different RF carrier frequencies from each other. Each of the RF frontend modules 20 is connected to the baseband radio 10 to provide signal communications therebetween in the form of binary digital data (which may form a voice signal between two end users, or application data, etc.).

As shown in FIG. 2, baseband radio may comprise a baseband processor 12 and busses 14 formed on a printed circuit board 18. Each RF frontend module 20 may include signal processing circuitry 22, bus 23, an RF waveguide 24 (e.g., coaxial cable), one or more RF antennas 25 and a printed circuit board 26. The signal processing circuitry 22, bus 23, and RF waveguide 24 may be mounted on and/or be formed as elements of the printed circuit board 26. Signal processing circuitry 22 of each RF frontend 20 may exchange binary digital data with baseband processor 12. More specifically, each RF frontend 20 may receive I and Q signals in digital binary form from the baseband processor and convert the same to an RF electrical signal which is then used to drive antenna 25 to emit an RF electromagnetic wave. In addition, each RF frontend 20 may receive an RF electromagnetic wave from one or more external sources and convert the same to an RF electrical signal, which is then converted to I and Q signals in digital binary form and transmitted to the baseband processor 12. The transmitted and received RF electromagnetic waves may form a plurality of wireless links to a plurality of mobile devices (e.g., in the form of an OFDM RF electromagnetic signal).

In performing wireless transmission, the baseband processor 12 may convert binary data to input symbols (complex values representing a mapped constellation point to specify both amplitude and phase of a sinusoid for a subcarrier). For example, QAM source data may be mapped onto N orthogonal subcarriers that are "orthogonal" to each other (in an OFDM signal). The baseband processor 12 may perform digital signal processing, such as IFFT (inverse fast Fourier transform) to generate the summation of the plurality of sinusoids of different subcarriers and provide OFDM symbols in the form of I and Q digital data (forming a complex number (I+jQ) that represent an OFDM symbol). In performing wireless receiving, the baseband processor may perform the reverse process and convert I and Q digital data (forming a complex number (I+jQ) that represents an OFDM symbol) that has been received from an RF frontend 20 into a plurality of QAM data of N orthogonal subcarriers, which are then converted into N streams of data. Additional conventional processing may also be performed by the baseband processor 12 such as data scrambling, encoding, guard insertion, preamble insertion, etc., in connection with transmission, as well as the reverse processes in connection with receiving.

Figure 3A:
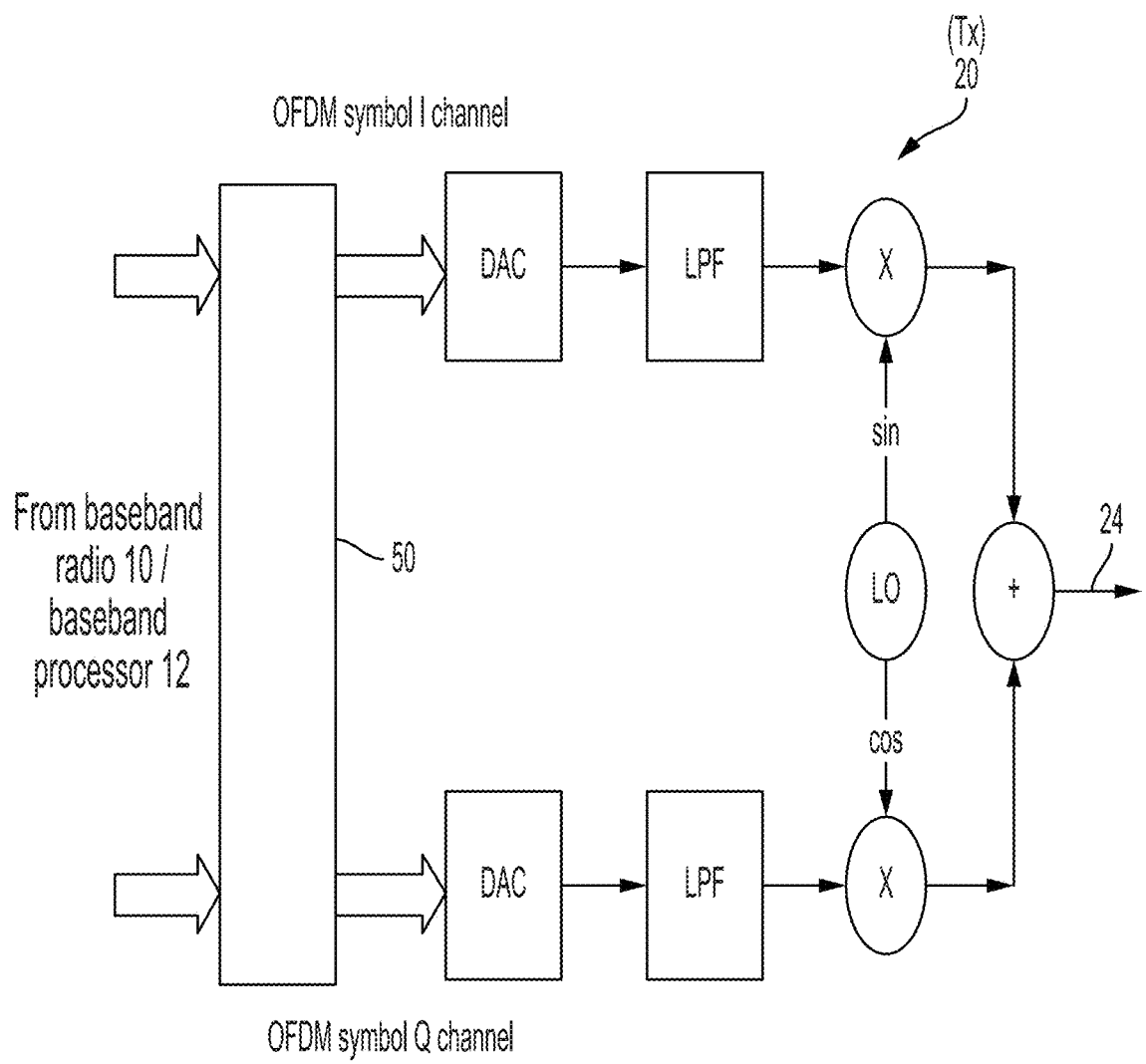
FIGS. 3A and 3B depict example details of RF frontend modules usable with the portable cellular base station, according to certain embodiments.

The I and Q channel digital data provided by the baseband processor 12 may be received by a selected one of the frontend modules 20, converted into a corresponding OFDM RF signal by signal processing circuitry 22, which is then used to drive a corresponding antenna 25 to output a corresponding electromagnetic OFDM RF signal. With respect to the transmission side (see FIG. 3A), the signal processing circuitry 22 of a frontend module may comprise a digital to analog converter (DAC) to convert the I and Q channel digital data into corresponding I and Q analog signals. As noted, the I and Q channel digital data may form an OFDM symbol, and a sequential series of OFDM symbols may be used to generate an OFDM signal that forms a plurality of wireless links on a plurality of orthogonally spaced subcarriers about the RF carrier frequency. The signal processing circuitry may comprise a local oscillator to generate an RF carrier signal and a quadrature mixer. After filtering by a low pass filter LPF, the I and Q analog signals output by the DAC may be quadrature mixed by the quadrature mixer with the RF carrier signal generated by the LO (modulated at an RF carrier frequency respectively offset by 90 degrees), with two upconverted components being summed together to provide the RF transmission signal on RF waveguide 24. The RF frontend may thus generate an OFDM (orthogonal frequency-divisional multiplexing) RF signal which is then provided to antenna 25 and transmitted wirelessly to provide a plurality of wireless communication links to mobile devices.

Figure 3B:
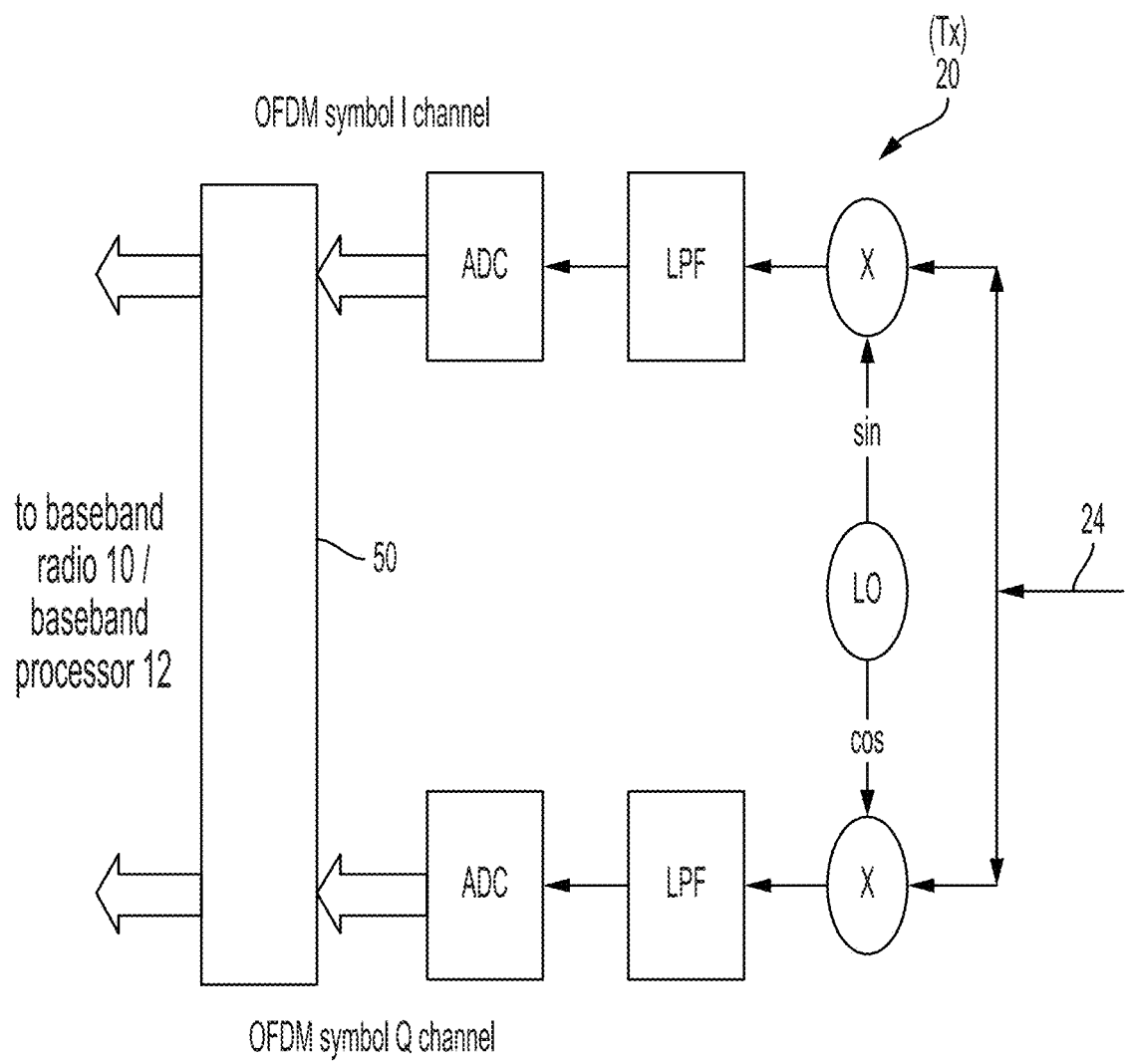

In performing wireless receiving, a reverse process may be applied. Antenna 25 may receive an RF electromagnetic signal which is provided as an RF electrical signal to the signal processing circuitry 22 via RF waveguide 24. As represented in FIG. 3B, the RF electrical signal provided by the RF waveguide 24 may be quadrature-mixed (with signals of the RF carrier frequency that are offset by 90 degrees from one another) which are then filtered by low pass filters LPF and digitized by analog to digital converters (ADC) to extract the real and imaginary components of the OFDM symbol (the I and Q channel digital data), which may then be transmitted to the baseband processor 12. Other types of wireless communications may be used instead of or in addition to OFDM, such as time division multiplexing (TDM). In some implementations, the cellular base station 100 may conform to LTE and the combination of the baseband radio 10 and an RF frontend module 20 may correspond to an evolved base station (eNodeB or eNB) according to the LTE standard. In some embodiments, cellular base station 100 and one or more of the baseband radios 10 and/or the RF frontend modules 20 can conform to a 5G wireless communication standard, although it is appreciated that various other wireless and/or cellular communication standards can be utilized without departing from the scope of the present disclosure.

An interposer board 40 may connect the baseband processor 12 to the signal processing circuitry 22 of each RF frontend module 20 to provide communications of the transmitted and received binary digital data therebetween. For example, a first signal path may be formed between baseband processor 12 and signal processing circuitry 22a of the first RF frontend module 20a via bus 14a, connector 50a, bus 42a, connector 50c and bus 23a. A second signal path may be formed between baseband processor 12 and signal processing circuitry 2ba of the second RF frontend module 20b via bus 14b, connector 50b, bus 42b, connector 50d and bus 23b. Although separate signal paths are formed between the baseband processor 12 and corresponding front ends 20a, 20b, a single shared signal path may be formed between the baseband processor 12 and multiple frontends 20 (e.g., 20a, 20b) with address signals (or frontend selection signals) being used to select the frontend (e.g., 20a or 20b) to communicate with the baseband processor 12.

Each of the electrical connectors 50 may comprise a plug and socket connector having a first portion attached to the interposer board 40 and a second portion attached to either the printed circuit board 18 of the base band radio 10 (in the case of connectors 50a and 50b) or to a printed circuit board 26 of a corresponding RF frontend module 20 (as in the case of connectors 50c and 50d). The interposer board 40 may thus provide a detachable electrical signal connection between the baseband radio 10 and the RF frontend modules 20, and more specifically, between the processor 12 of the baseband radio 10 and the RF frontend modules 20. Although an interposer board 40 is used in this example to provide a detachable electrical connection, alternative structure may be used, such plural flexible cables, each having portions of connectors attached at either end (e.g., a first cable forming bus 42a extending between connectors 50a and 50c and a second cable forming bus 42b extending between connectors 50b and 50d).

Edge server 30 may comprise a computer stack and may be configured to provide backend processing of the cellular network. Although not illustrated, the edge server and/or the computer stack can include one or more of the following components: at least one central processing unit (CPU) configured to execute computer program instructions to perform various processes and methods, random access memory (RAM) and read only memory (ROM) configured to access and store data and information and computer program instructions, input/output (I/O) devices configured to provide input and/or output (e.g., keyboard, mouse, display, speakers, printers, modems, network cards, etc.), and storage media or other suitable type of memory (e.g., such as, for example, RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives, any type of tangible and non-transitory storage medium) where data and/or instructions can be stored.

The computer stack of the edge server 30 may host multiple Virtual Machines ("VMs") which run software instances at the edge, thereby removing the need for connectivity to a higher echelon network for subscription services, which include, but are not limited to the following: an Evolved Packet Core ("EPC"); a situational awareness software server; a softphone application program; a voice and chat application; a streaming solution; and a satellite communication ("SATCOM") situational awareness application. These VMs may act as the control unit for not only radio operations, but also for network service operations.

The situational awareness software server may include a geospatial mapping engine, originally developed for the Android Operating System, which allows for precision targeting, surrounding land formation intelligence, situational awareness, navigation, and data sharing. The softphone application program may enable Voice over Internet Protocol ("VOIP") telephone calls from one or more computing devices. The voice and chat application may be an encrypted VoIP application, which allows users to talk to each other via the same server. The streaming solution may allow for a server/client that can stream and receive network streams. The SATCOM situational awareness application may include an encrypted web interface that enables centralized or remote monitoring and control.

For example, edge server 30 may be configured by software to form an evolved packet core (EPC) according to LTE. The EPC may be a framework for providing converged voice and data on a 4G Long-Term Evolution ("LTE") network. The EPC network elements may consist of the Mobility Management Entity ("MME"), Home Subscription Server ("HSS"), Serving Gateway ("S-GW"), Packet Gateway ("P-GW"), and policy and charging rules function server (PCRF server).

The MME module of the edge server 30 may perform security procedures such as end-user authentication and implementing ciphering and integrity protection algorithms. The MME module may also determine Quality of Service of a particular wireless link. For example, the HSS module may perform user identification and addressing (e.g., in referencing a database of mobile subscriber ISDN numbers or mobile telephone numbers) as well as determine related user profile information associate with an identified user (e.g., subscriber information such as allowed traffic class, maximum bit rate, Quality of Service, etc.). The edge server 30 may communicate with baseband processor 12 via bus 14c. Bus 14c may be formed on printed circuit board 18 of the baseband radio 10 and extend to connect to the edge server 30 (e.g., through connectors (not shown)).

The baseband radio 10, the frontend modules 20, the edge server 30 and the interposer module 40 may be located within a single housing 60 which may encase the elements of the cellular base station 100. FIG. 1 illustrates a base portion of housing 60, i.e., such that the interior volume/contents of housing 60 can be seen. Housing 60 may also include a cap (e.g., a flat plate) that connects to the base of housing 60. The cap and the base of housing 60 may be detachably connected together with fasteners, such as by clasps or screws, allowing a user to modify the components of the cellular base station 100 (as described elsewhere herein). Antennas 25 may be provided within housing 60 or outside housing 60 and connected to corresponding signal processing circuitry via the RF waveguide 24 (e.g., extending through housing 60 by connecting two coaxial cables with a coaxial connector—one shown in FIG. 1). Housing 60 may be formed of a rugged material (e.g., molded epoxy resin or a metal casing) and may be environmentally sealed (e.g., waterproof). An internal rechargeable battery 70 may be provided within housing 60 to provide power to the components of the cellular base station. Rechargeable battery 70 may be a primary source of power or may be a secondary source of power (e.g., a backup battery operable in response to detecting that a primary source of power outside the housing 60 is unavailable).

Each of the RF frontend modules 20 may be physically detachably connected to housing 60. For example, pegs (not shown) extending from the base of housing 60 (below the RF front end modules in FIG. 1) may extend through corresponding holes in the printed circuit boards 26 of the RF frontend modules 20. Upper portions of the pegs may correspond in size (e.g., slightly smaller in diameter) with the corresponding holes in the printed circuit boards 26 through which they extend, while lower portions of the pegs may have a larger size than the corresponding holes to support the printed circuitry board 26 and provide a spacing between the printed circuit board 26 and the bottom of the base of the housing 60. A fastener (not shown), such as a nut, may be attached to the smaller diameter pegs above the printed circuit board 26 to vertically fasten the printed circuit board in place. Horizontal movement of the printed circuit board 26 may be restricted by the pegs.

Each of the RF frontend modules 20 may be operable at different RF carrier frequencies. Components of the RF frontend modules 20 may thus be selected to operate at the RF carrier frequency of the RF frontend module 20. For example, the local oscillator LO of each RF frontend module may be configured to generate a different RF carrier frequency for the up-conversion and down-conversion signal processing described herein. Further, RF waveguides 24 and antennas 25 may have different sizes and/or configurations to optimize transmission/reception of RF signals (as described herein) at the RF carrier frequency of the RF frontend module 20, where use of the same RF waveguides 24 and antennas 25 in another RF frontend module 20 may act to filter and/or attenuate the RF signals to be transmitted/received.

In operation, a cellular network may be formed with the mobile cellular base station 100 and a plurality of mobile devices in the cell (e.g., macro-cell) formed by the mobile cellular base station 100. The cellular network may be formed using a selected one or more of the RF frontend modules 20 at the different RF carrier frequencies. Thus, a user may select an LTE band or several LTE bands in which to form a single cellular network. User selection may be performed in several ways, such as by use of a user interface (not shown) to select a corresponding mode of operation by the cellular base station, software programming, etc. Notably, the cellular network(s) formed by mobile cellular base station 100 can comprise a hardened, private network that provides enhanced security and reliability for users and the plurality of mobile devices connected to mobile cellular base station 100. In some embodiments, mobile cellular base station 100 can provide the ability to tie-in to an existing cellular network, e.g., by connecting its private LTE network to one or more public LTE networks existing in the same physical vicinity.

In addition, the mobile cellular base station 100 may automatically reconfigure an established cellular network to switch from one LTE band to another. For example, after establishing a cellular network and related wireless communication links between mobile devices using a first RF frontend operating at a first LTE band, the cellular base station may (a) initiate and establish new duplicative wireless links between the same mobile devices using a second RF frontend operating at a second LTE band and (b) subsequently shutdown wireless communications (and associated wireless links) established with the first RF frontend. In some embodiments, mobile cellular base station 100 can automatically reconfigure its active LTE bands (and the associated RF frontends) in order to avoid interfering with the LTE bands reserved for existing, local LTE networks. For example, this automatic reconfiguration can be based on an analysis of external LTE signals/transmissions detected by mobile cellular base station 100. Additionally or alternatively, the automatic reconfiguration can be based on a detected geographic location of the mobile cellular base station 100, e.g., wherein certain geographic locations are associated with LTE bands that are reserved for local/public use and therefore should not be used by mobile cellular base station 100.

Handoff operations may thus be performed in a manner similar to those performed when a mobile device moves from one cell to a neighboring cell in a conventional cellular network. However, the handoff operations performed by the cellular base station 100 may be performed for mobile devices remaining in the same cell (i.e., coverage area of the cellular base station 100), and with respect to the same baseband radio 10, but with respect to use of different RF frontends to replace a wireless link between two mobile devices with a newly formed wireless link.

For example, a first eNodeB may correspond to a first module of the baseband radio 10 and a first RF frontend module operating as described herein to process a first OFDM broadband signal (e.g., at a first LTE band). A second eNodeB may be implemented with a second module of the baseband radio 10 and a second RF frontend module to establish a second OFDM broadband signal (e.g. at a second LTE band). Handoff may be made between wireless links established using the first eNodeB to corresponding newly established wireless links using the second eNodeB. In some examples, use of a virtual X2 interface according to LTE and its functionality may be employed within the cellular base station 100 (i.e., the X2 interface and related functionality may be employed within housing 60 without interfacing with a different cellular base station). Thus, switching from an existing wireless link between two mobile devices at one LTE band to a newly established wireless link between the two mobile devices at a different LTE band may be performed automatically without interrupting communications between the two mobile devices.

In some examples, the cellular base station 100 is configured to operate using bandwidth less than its maximum bandwidth. For example, half or more of the RF frontends may be kept dormant and related OFDM broadband communications provided in LTE bands of the dormant RF frontends may be left unused until a handoff event occurs. When a handoff event is determined to be appropriate, after the handoff, a new subset of the RF frontends (e.g., half or more) may be kept dormant. In this way, signature reduction of the cellular base station may be provided to reduce chances of detection, which may be of significant importance to warfighters in a battlefield environment.

RF frontends 20 that are dormant to prevent transmitting an OFDM broadband signal (e.g., Tx dormant) may be operational for receiving and monitoring RF of the Tx dormant RF frontend 20. When operating in this Tx dormant manner, although no wireless links may be established with the Tx dormant frontend, the RF signal received and processed by the Tx dormant frontend may be analyzed to evaluate a signal to noise ratio (SNR) in a SNR floor listening mode. Should the SNR floor suddenly rise to a new level, it may indicate that a jamming event is taking place to jam communications of the cellular base station (with respect to the operation of other RF frontends at other LTE bands). Thus, in response to detecting an increase of the SNR floor to a new level (e.g., a certain threshold, such as a predetermined percentage increase over the originally detected SNR), the cellular base station may automatically perform handoff operations from established wireless links using a first frontend module and a first LTE band to newly established corresponding wireless links using a second frontend module and a second LTE band (as described herein), and terminate the original wireless lines using the first frontend module and the first LTE band.

As noted herein, the RF frontends are detachably connected within the housing 60 and to the base band radio 10. Thus, the cellular base station radio 100 may be easily modified by a user to replace RF frontend modules 20 with different RF frontend modules 20. In some embodiments, aspects of the disclosure can be provided in the form of a cellular base station kit. The cellular base station kit may comprise the baseband radio 10, the embedded edge server 30, and battery 70 formed within housing 60. The housing 60 may comprise n connection slots (e.g., sets of pegs) for attaching n RF frontend modules 20, where n is a number equal to or greater than 2. Each of the connection slots may be formed to physically attach an RF frontend module (removably or permanently) to the housing 60, using for example pegs, clasps, etc.

The cellular base station kit may also comprise m RF frontend modules 20 (with m being an integer greater than n), with each of the m RF frontend modules 20 configured to operate at a different RF carrier frequency (e.g., at a different LTE band). From the m RF frontend modules, a user may select n of the m RF frontend modules 20 and attach them to the housing 60 using the n connection slots. The cellular base station kit may also comprise a signal connector, such as interposer board 40, to connect the RF frontends to the baseband processor 12 to provide signal communications therebetween (as described herein). For example, the cellular base station kit may be provided with RF frontend modules that respectively operate in the following LTE bands: Band 13 (700 MHz spectrum), Band 5 (824 MHz-894 MHZ), Band 10 (1710 MHZ-2170 MHz), Band 30 (2300 MHZ-2360 MHz).

In the specific example illustrated in FIGS. 1 and 2, only two RF frontends 20 are shown as being implemented as part of the cellular base station 100. However, it is possible that more than two RF frontends 20 are implemented as part of the cellular base station 100 (and connected to the base band radio 10 and baseband processor 12 as described herein). For example, four or more RF frontends 20 may be removably attached to the housing 60 and have removably attached signal connections with the baseband processor 12. Thus, a portable cellular base station may be both (a) operable with multiple RF frontends at different LTE bands using only a single baseband processor 12 of a single baseband radio 10 and (b) configurable to select the desired RF frontends in a modular or "plug-and-play" manner. It should be apparent that the physical structure of each RF frontend 20 may be the same, such that the physical and electrical connections of an RF frontend 20 may be used without modification no matter which physical slot the RF frontend 20 is connected to within the housing 60.

In some examples, cellular base station 100 may provide macro-cell coverage. For example, a coverage area provided by the cellular base station 100 may have a range greater than two kilometers, such as within an area greater than 5 kilometers, greater than 10 kilometers and provide wireless links to mobile devices within a 35-kilometer range.

Aspects of the present disclosure provide mobile broadband communication systems with band agility. A mobile cellular base station (e.g., portable and/or mountable on a vehicle) such as base station 100 is provided with several MIMO RF frontend modules operating at different RF carrier frequencies. The mobile cellular base station may use a selected subset (e.g., one) of the RF frontend modules to provide communication links to multiple users using standard mobile devices (e.g., cell phones or other handheld devices) and establish communications therebetween. Switching between the RF frontend modules may be done automatically or by a user. Further, the MIMO RF frontend modules may be detachable so that different RF carrier families may be used with the same baseband radio to support use within different environments.

The mobile cellular base station 100 may be deployed to quickly establish a broadband communications network within a corresponding cell formed by the mobile cellular base station. Connection to an access point may be unnecessary in certain implementations.

The cellular base station 100 may be portable. For example, the cellular base station may be carried by a human in a backpack. The cellular base station 100 may also be mounted to a vehicle, such as a truck, an unmanned aerial vehicle (e.g., a drone) or to an unmanned ground vehicle. Different physical implementations of the cellular base station 100 may be achieved with the baseband radio 10, embedded edge server 30 and RF frontend modules 20, within different housings 60 (having different slot connections for attaching the RF frontend module 20 in different configurations) and using different configurations of interposer board 40.

In some embodiments, an interposer board 40 may be used, but the disclosure is not limited thereto. For example, two LTE front ends may be attached directly to a specialized baseband card containing hardware configured to perform the same function as that of an interposer board functioning as a separate item.

Figure 4:
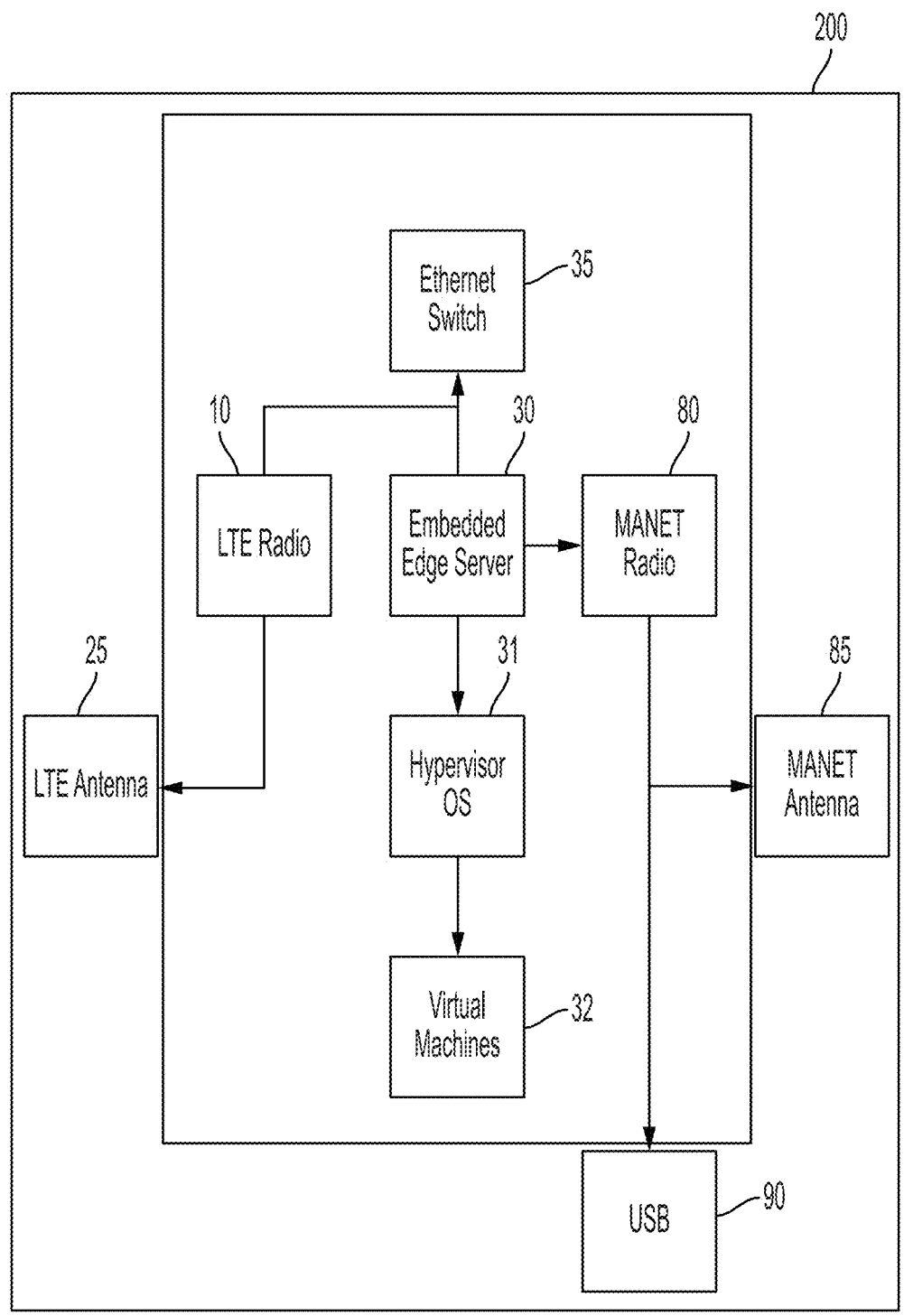
FIG. 4 depicts a block diagram of an example multi-modal communication station, according to certain embodiments.

The disclosure turns next to FIG. 4, which depicts a block diagram of an example multi-modal communication system 200. Multi-modal communication system 200 includes a cellular base station, which in some embodiments can be similar or identical to the cellular base station 100 discussed above, that is able to provide a first communication mode and one or more additional communication modes. For example, the first communication mode can be implemented via LTE or cellular radio, while the additional communication modes can be implemented via MANET (mobile ad-hoc network), satellite, VLC (visible light communication), additional LTE or cellular radios, etc. It is noted that this listing of different communication modes is provided for purposes of illustration and is not to be construed as limiting. Likewise, although FIG. 4 shows a MANET Radio 80 and MANET Antenna 85, it is appreciated that this is for purposes of example and illustration only, and is not to be construed as limiting—without departing from the scope of the present disclosure, multi-modal communication system 200 can supplement and/or replace MANET Radio 80, MANET Antenna 85 with corresponding radio/antenna/transceiver components for satellite, VLC, and various other additional communication modes as needed or desired.

Figure 5:
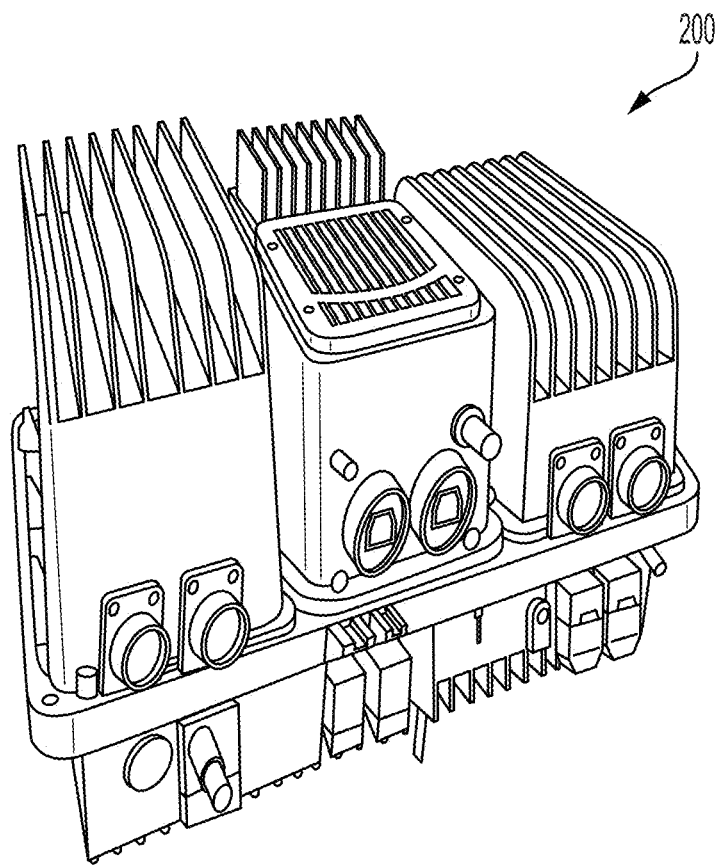
FIG. 5 depicts a diagram illustrating an example housing for a multi-modal communication station, according to certain embodiments.

Notably, the multi-modal communication system 200 can be provided as a single unit, e.g., as seen in FIG. 5, which illustrates an example housing 60 for the multi-modal communication system 200. In some embodiments, and as is described in greater detail below, multi-modal communication system 200 can be seen to implement a PACE (Primary, Alternate, Contingency, and Emergency) communication plan through the first communication mode and the additional communication modes, which are all provided and integrated within the same housing 60. Advantageously, multi-modal communication system 200 collapses the necessary hardware and other components required to implement a PACE plan into a single footprint—a single footprint which moreover can be portable and durable for use in highly demanding situations and environments. The use of the presently disclosed multi-modal communication system to implement a PACE plan is discussed in greater depth with respect to FIG. 8.

Returning to FIGS. 4 and 5, as illustrated, one or more components comprising cellular base station 100 may be included in a multi-modal communication system 200. For example, the multi-modal communication system 200 may include baseband radio 10, RF frontends 20, embedded edge server 30, interposer board 40, and rechargeable battery 70. In addition, the multi-modal communication system 200 may include an Ethernet switch 35, a MANET radio 80, one or more MANET radio antennas 85, and a USB port 90. Although not depicted, multi-modal communication system 200 may additionally include a satellite communications system and/or antenna, e.g., for providing radio telecommunications signals between the multi-modal communication system 200 and one or more satellites in Earth's orbit. As will be discussed in greater depth below, multi-modal communication system 200 can perform an automatic intelligent failover between different available communication modes, e.g., between different LTE bands, from LTE to MANET, LTE to satellite, MANET to satellite, etc., to ensure that the best communication quality is provided in response to dynamically changing environmental conditions and/or mission parameters and requirements.

MANET (mobile ad-hoc network) radio 80 may provide for integrated layer two connectivity to other meshed nodes, wirelessly. This communication modality is a continuously self-configuring, infrastructure-less network of mobile devices connected wirelessly. In the event of an LTE communications failure or loss, the communicator would continue to have the ability to pass network traffic over the MANET network as an alternate means of communication. Through the use of embedded and network-integrated MANET radios, the network nodes may be able to geographically move and reposition while maintaining the most efficient possible routing mechanism to transmit data from node to node. In some embodiments, the MANET network can be used as a communication backhaul to extend communication coverage to mobile devices that are otherwise beyond the coverage area of the private cellular (e.g., LTE) network created by the multi-modal communication system 200. Likewise, the satellite communication network, which offers the greatest coverage range of the communication modalities discussed above, could also be used as a communication backhaul, for example, in scenarios in which MANET is unavailable or offers insufficient range, scenarios in which increased reliability is required over increased bandwidth, etc.

Ethernet switch 35 may be used to connect the computer stack, the MANET radio 80, and the LTE radio 20. MANET radio antennas 85 may be provided within housing 60, outside housing 60, and/or as a modular component that can be removably attached and detached by a user as desired, and furthermore may be connected to corresponding signal processing circuitry. In embodiments where satellite communications are provided by multi-modal communication system 200, Ethernet switch 35 may further be used to connect the satellite communications system/components. Like the MANET radio antennas 85, the satellite communications system/components can be connected to corresponding signal processing circuitry and may be provided within housing 60, outside housing 60, and/or as a modular component that can be removably attached and detached by a user as desired.

Figure 6A:
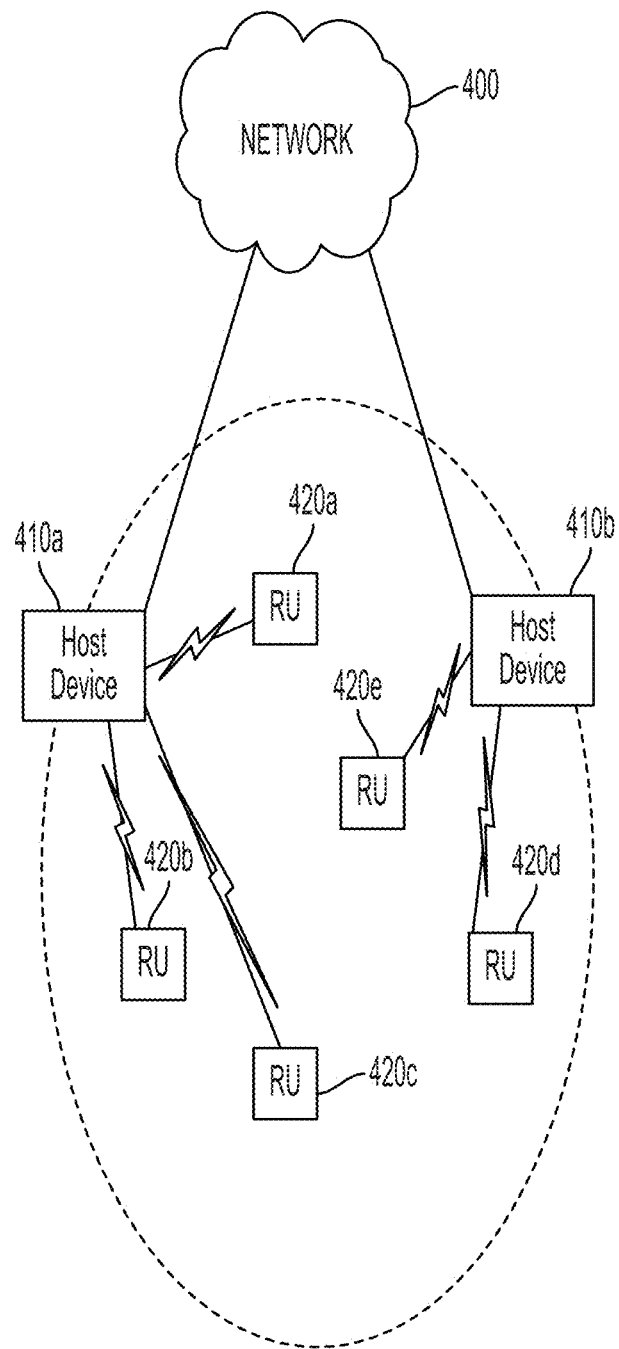
FIG. 6A depicts a diagram illustrating a multi-modal communication station operating in a first communication mode, according to certain embodiments.

FIG. 6A is a diagram illustrating a multi-modal communication system operating in a first communication mode, e.g., in an LTE configuration. Host devices 410a, 410b may be provided as multi-modal communication systems, and in some embodiments can be similar or identical to the multi-modal communication system 200 discussed above. Remote users ("RUs") 420a-e may form direct connections with one or the other of the host devices 410a, 410b and communicate with the host devices 410a, 410b using LTE protocols. In some embodiments, host devices 410a, 410b may communicate with other elements or users via network 400.

RUs 420a-e may be any type of electronic device and/or component configured to execute one or more processes. RUs 420a-e can include, by way of example and not limitation, clients, desktop computers, laptop computers, network computers, workstations, personal digital assistants (PDA), tablet computers and/or electronic readers (e.g., iPad, Kindle Fire, Playbook, Touchpad, etc.), telephony devices, smartphones, wireless base stations, wireless access devices, pagers, music playing devices (e.g., iPod, etc.), routers, hubs, cameras, printers, copiers, scanners, projectors, alarms, lights, home entertainment systems, audio/visual systems, home security devices, intercoms, domestic robots, appliances, HVAC systems, etc., or any component or sub-component of another RU 420a-e or assemblage, such as, for example, a car, a train, a plane, a boat, etc. Although not illustrated, RUs 420a-e can also include servers and/or databases. RUs 420a-e may be configured to transmit and/or receive information to and/or from other RUs 420a-e and/or host devices 410a,b directly and/or indirectly via any combination of wired and/or wireless communication systems, method, and devices, including, for example, network 400.

Network 400 may be any appropriate network or other communication link that allows communication between or among one or more computing systems and/or devices, such as, for example, host devices 410a,b and RUs 420a-e. Network 400 may be wired, wireless, or any combination thereof. Network 400 may include, for example, the Internet, a local area network, a wide area network, a WiFi network, a workstation peer-to-peer network, a direct link network, a Bluetooth connection, a bus, or any other suitable communication network or any combination thereof.

Figure 6B:
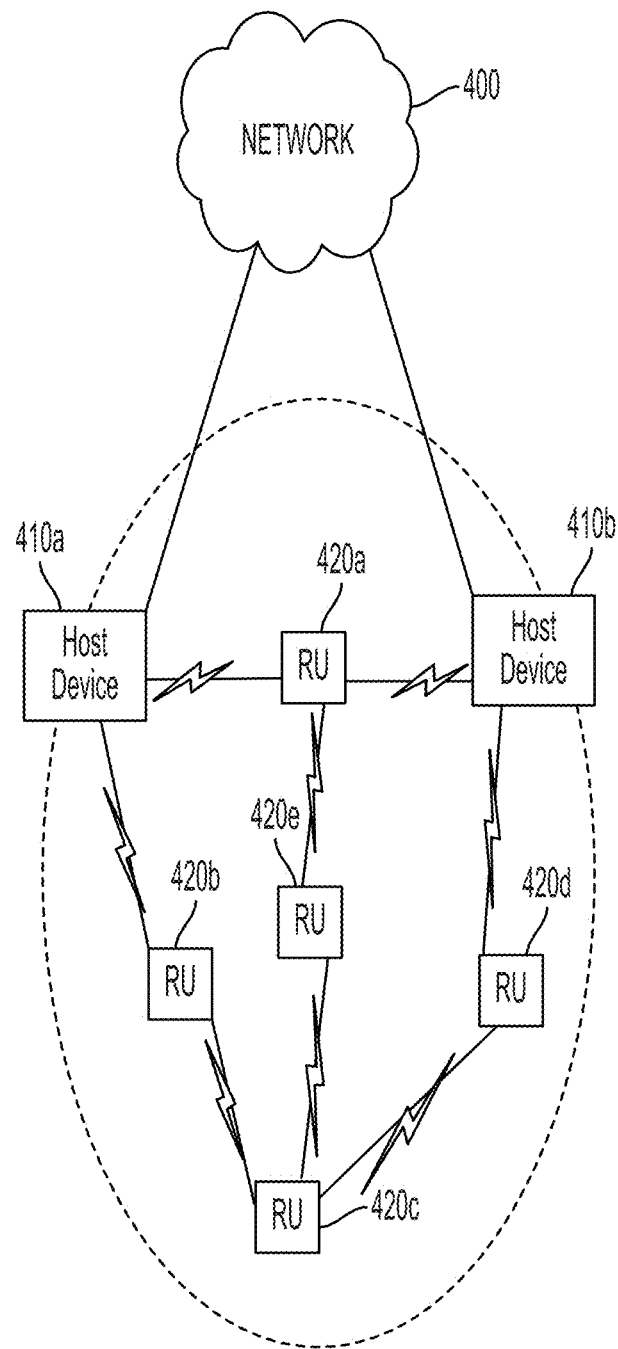
FIG. 6B depicts a diagram illustrating a multi-modal communication station operating in a second communication mode, according to certain embodiments.

FIG. 6B is a diagram illustrating the multi-modal communication system(s) of FIG. 6A operating in a second communication mode. Unlike in the first communication mode seen in FIG. 6A, in which each RU 420a-e was directly connected to one of the host devices 410a,b over the private LTE network, the second communication mode depicted in FIG. 6B represents a scenario in which a direct connection to the private LTE network is not available or otherwise not desirable for one or more of the RUs 420a-e, which in response automatically failover to a MANET radio configuration. Each of host devices 410a,b may be a multi-modal communication system, as discussed above and RUs 420a-e may form direct connections with one another, as well as with the host devices 410a,b. In this embodiment, each of the RUs 420a-e may be configured to form a connection and communicate with the host devices 410a,b and/or other RUs 420a-e using MANET protocols. In some embodiments, host devices 410a,b may communicate with other elements or users via network 400.

As shown in FIG. 6B, RUs 420a, 420b and 420d remain in direct connection with the host devices 410a and 410b, e.g., over the private LTE network created by the two host devices/the overall multi-modal communication system. However, RUs 420c and 420e are not connected to either of the host devices 410a,b or the private LTE network of the multi-modal communication system. As mentioned previously, this can occur for a variety of different reasons, including but not limited to, an insufficient or unavailable LTE signal at the location of the RU (e.g., one of the RUs 420c, e is in a "dead zone" of the private LTE network or is otherwise determined to have an insufficient signal strength to reliably connect to the host devices/the private LTE network), or a need to go silent over the LTE bands currently being used. In some embodiments, a switch to MANET by one or more of the RUs 420c,e can be made automatically in response to a determination that the increased bandwidth offered by connecting to the private LTE network is unnecessary for the current needs of the RU, and that power can therefore be conserved by switching to MANET instead. In operation, the MANET network is formed between at least the RUs 420c,e that are not directly connected to the private LTE network of the multi-modal communication system, and one or more of the remaining RUs 420a,b,d and the host devices 410,b.

In some embodiments, the MANET network can comprise all of the RUs 420a-e and host devices 410a,b. In operation, multicast routing can be performed over the devices participating in the MANET network in order to transmit data packets/communication signals between the RUs 420c,e at one end and the host device(s) 410a,b at the other end. For example, a data packet can be transmitted from RU 420c to RU 420b over the MANET network, and subsequently relayed from RU 420b to host device 410a. In some embodiments, the intermediate relay transmission between RU 420b and host device 410a can be performed over the MANET network as well (e.g., using the MANET radio 80 and/or MANET antennas 85). In some embodiments, the intermediate relay transmission between RU 420b and host device 410a can be performed over the private LTE network, recalling that RU 420b has a direct LTE connection. The determination of whether to use MANET or LTE for any intermediate and/or final hops to the host devices 410a,b can be made based on an analysis of the packets or signal transmission.

For example, a large or high priority transmission might be switched over to LTE as soon as an LTE communication link becomes available, to take advantage of the increased bandwidth available over LTE in comparison to MANET. However, a small or low priority transmission might remain on the MANET network for the entirety of its path to the host devices 410a,b—thereby reducing power consumption and the computational overhead required to perform network switching at the intermediate RU that would be required to receive a transmission over MANET and then retransmit it over the private LTE network. Although not shown, in some embodiments a satellite backhaul could be used to reduce the number of intermediate hops required to connect a RU outside of the private LTE network to one of the host devices 410a,b. In such a scenario, the RU 420c, e would communicate directly with an appropriate or available communication satellite, which would then forward the communications to a satellite transceiver associated with the host devices 410a,b or the overall multi-modal communication system. As will be discussed in greater depth below, an RU that is outside of the private LTE network (e.g., such as RU 420c,e) can first attempt to connect to the MANET network or otherwise establish a MANET network. If a MANET connection is unavailable (e.g., because no RUs are within range for establishing a MANET connection) then the RU 420c, e can then failback to satellite communications with the host devices 410a,b and/or the multi-modal communication system. In this manner, the multiple communication modalities integrated into the single footprint of the presently disclosed multi-modal communication system can be leveraged to provide seamless, extended communications coverage for the plurality of RUs.

Figure 7:
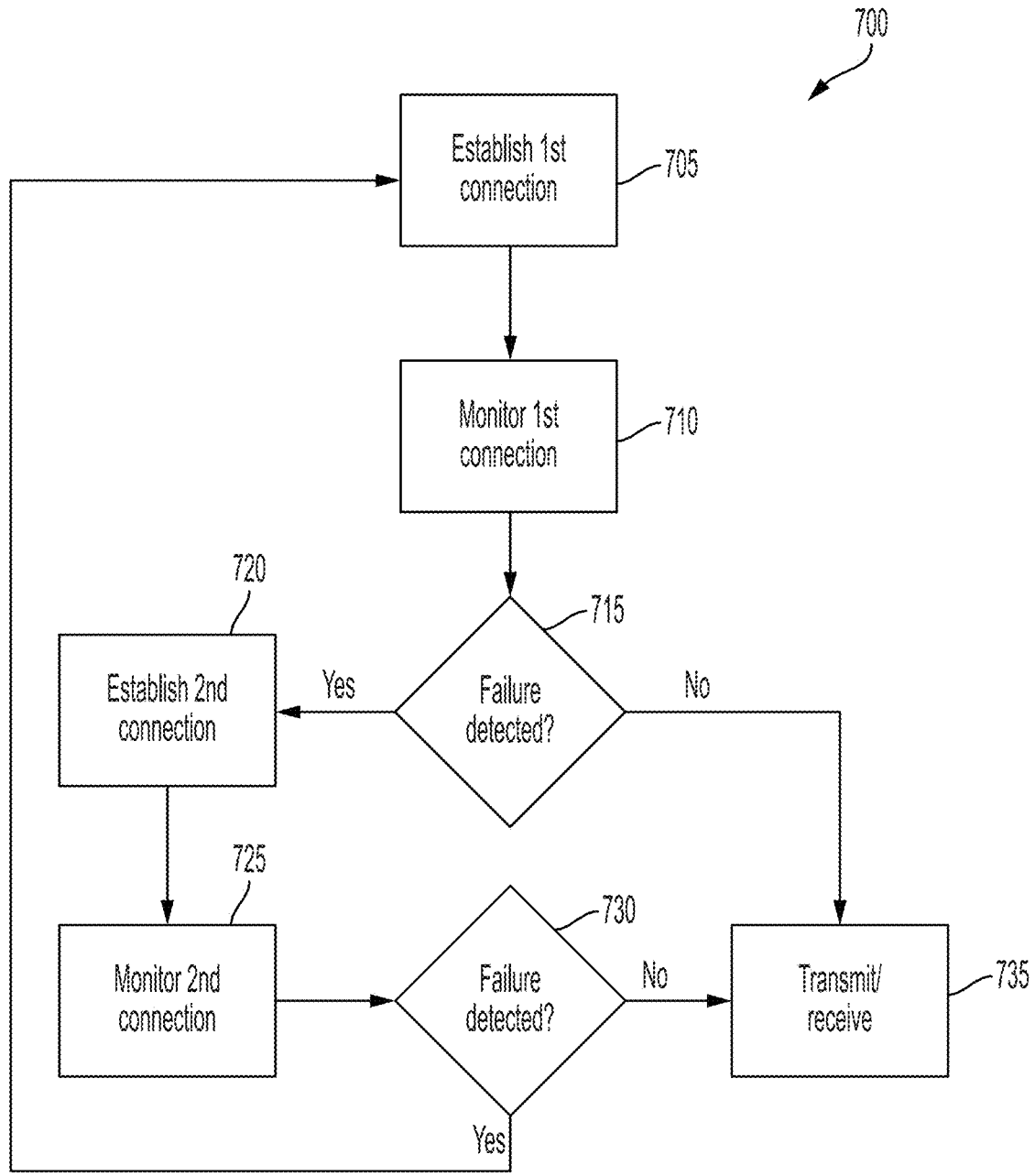
FIG. 7 depicts a flowchart illustrating an example connection and communication process in a multi-modal communication system, according to certain embodiments.

Turning next to FIG. 7, shown is a flowchart 700 illustrating an example connection and communication process in a multi-modal communication system, according to certain example embodiments. Referring to FIGS. 6A and 7, a first connection may be established between a host device 410 and at least one RU 420 (step 705). The first connection may be established according to, for example, LTE protocols, i.e., over a private LTE network provided by the multi-modal communication system, as described above. The first connection may be monitored to determine if the connection between the host device 410 and at least one RU 420 will allow communication between the host device 410 and the RU 420 (step 710). For example, the first connection may be monitored to determine if the connection has failed (e.g., connection lost and/or connection of poor quality). In some embodiments, connection failure can be determined by a failure to establish or detect an LTE handshake over a pre-determined period of time. In some embodiments, bandwidth and various other network performance characteristics can be automatically and continuously analyzed in order to determine if an automatic failover should be performed to MANET (or satellite communications or other additional network/communication modalities provided by the presently disclosed multi-modal communication system). If a failure of the connection is not detected (step 715, No), transmission and/or reception may be continued through the first connection (step 735). In some embodiments, the monitoring of the first connection may be performed by the EPC 30.

When a failure of the first connection is detected or it is otherwise automatically determined that a failover should be initiated (step 715, Yes), a second connection may automatically be established between the host device 410 and the RU 420 (step 720). The second connection may be established according to, for example, MANET protocols, although the second connection may also be established over satellite communications or any of the other additional networks/communication modalities provided by the multi-modal communication system, without departing from the scope of the present disclosure. When the second connection is established, the first connection may be disconnected. In some embodiments, the first connection can remain active in order to permit monitoring and analysis of connection quality to determine when or if the first connection recovers and can resume use. The establishment of the second connection and release of the first connection may be part of a failover process. In some embodiments, the EPC server 30 may initiate the failover process.

Once the second connection is established, the second connection may be monitored to determine if the connection between the host device 410 and at least one RU 420 will allow communication between the host device 410 and the RU 420 (step 725). For example, the second connection may be monitored to determine if the connection has failed (e.g., connection lost and/or connection of poor quality). If a failure of the second connection is not detected (step 730, No), transmission and/or reception may be continued through the second connection (step 735). In some embodiments, the monitoring of the second connection may be performed by the EPC 30.

When a failure of the second connection is detected (step 730, Yes), the first connection may be automatically re-established between the host device 410 and the RU 420 (step 705). As discussed above, the first connection may be established according to, for example, LTE protocols. When the first connection is re-established, the second connection may be disconnected. The re-establishment of the first connection and release of the second connection may be part of an automatic intelligent failover process performed by the presently disclosed multi-modal communication system. In some embodiments, the EPC server 30 may initiate the failover process.

Although not illustrated in FIG. 7, in some embodiments, when a failure of the second connection is detected, a third connection may be established. The third connection may be established according to another protocol (e.g., a protocol other than LTE and MANET). When the third connection is established, the second connection may be released, and transmission/reception may then occur via the third connection. For example, the third connection can be established over satellite communications or VLC, as mentioned previously, although it is noted that other communication modalities can be utilized without departing from the scope of the present disclosure.

Figure 8:
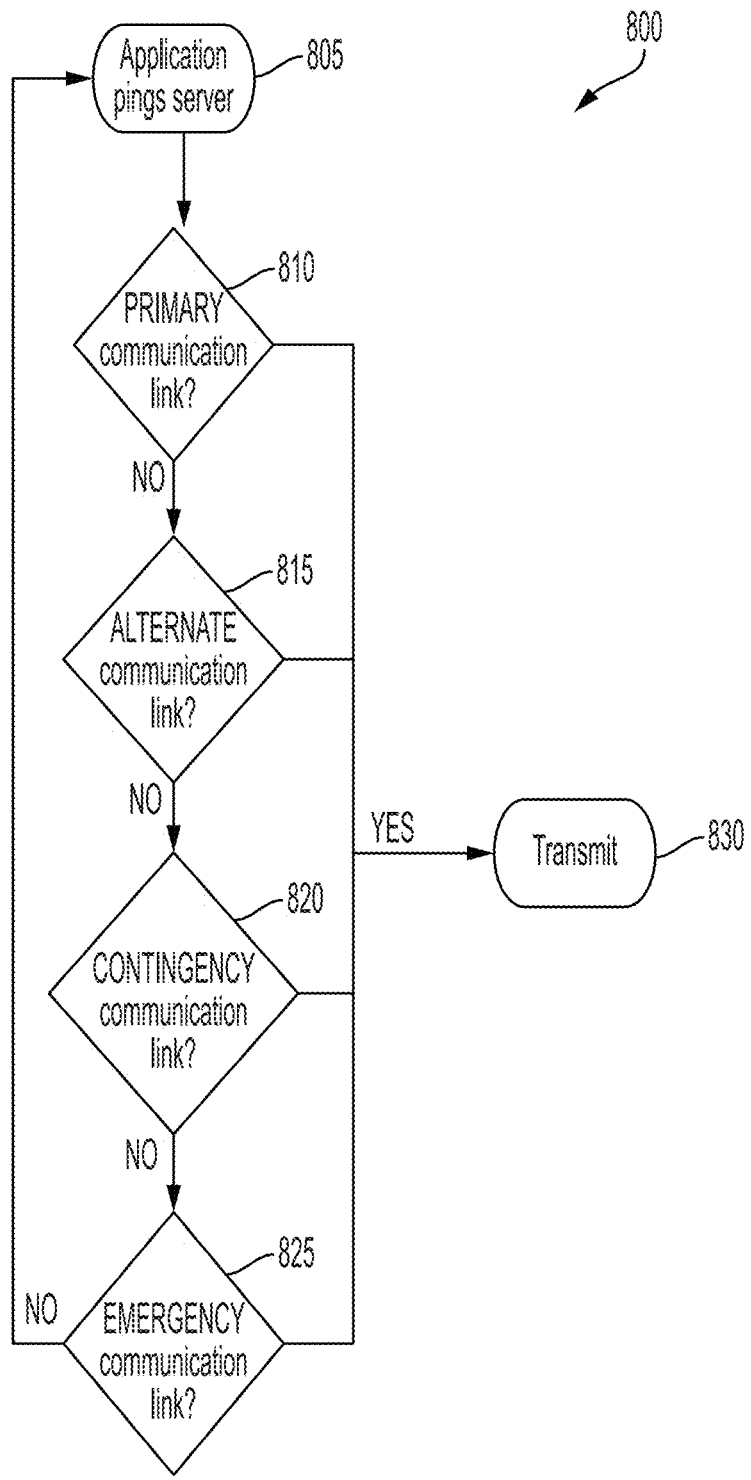
FIG. 8 depicts a flowchart illustrating an example failover process in a multi-modal communication system, according to certain embodiments.

FIG. 8 is a flowchart 800 illustrating an example failover process in a multi-modal communication system, according to certain example embodiments. In particular, FIG. 8 illustrates an example failover plan including a primary communication link, an alternate communication link, a contingency communication link, and an emergency communication link (e.g., a PACE communication plan). Each of the primary communication link, the alternate communication link, the contingency communication link, and the emergency communication link may be a connection or a communication channel between the host device 410 and one or more of the RUs 420. In some embodiments, the PACE communication links can be selected from one or more of the different communication modalities and/or networks provided by the presently disclosed multi-modal communication system, e.g., LTE, MANET, satellite communication, VLC, etc.

As illustrated, an application may ping the server (step 805), triggering communication between the host device 410 and one or more of the RUs 420. If the primary communication link is established and available for data transmission (step 810, Yes), the host device 410 may transmit data to the RU 420 via the primary communication link (step 830).

If the primary communication link has failed or is otherwise unavailable (step 810, No), an alternate communication link may be assessed (step 815). If the alternate communication link is established and available for data transmission (step 815, Yes), the host device 410 may transmit data to the RU 420 via the alternate communication link (step 830). If the alternate communication link has failed or is otherwise unavailable (step 815, No), a contingency communication link may be assessed (step 820). If the contingency communication link is established and available for data transmission (step 820, Yes), the host device 410 may transmit data to the RU 420 via the contingency communication link (step 830). If the contingency communication link has failed or is otherwise unavailable (step 820, No), an emergency communication link may be assessed (step 825). If the emergency communication link is established and available for data transmission (step 825, Yes), the host device 410 may transmit data to the RU 420 via the emergency communication link (step 830). If the emergency communication link has failed or is otherwise unavailable (step 825, No), the application may again ping the server (step 805), and the process may begin again.

Figure 9:
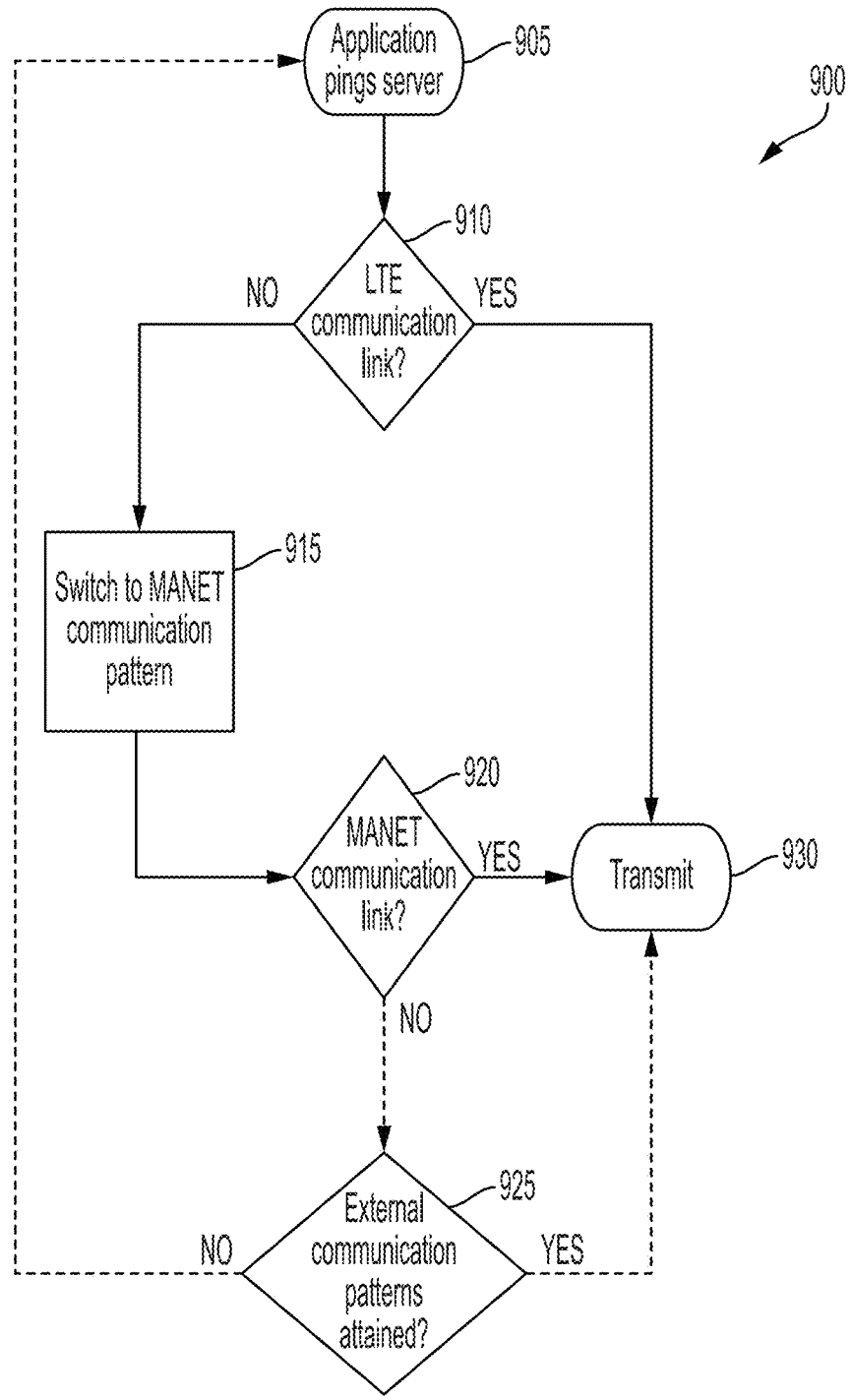
FIG. 9 depicts a flowchart illustrating an example failover process in a multi-modal communication system, according to certain embodiments.

FIG. 9 is a flowchart 900 illustrating an example failover process in a multi-modal communication system, according to certain example embodiments. In particular, FIG. 9 illustrates an example failover plan including an LTE communication link as the primary communication link and a MANET communication link as the alternate communication link. The LTE communication link and the MANET communication link may be connections or communication channels between the host device 410 and one or more of the RUs 420, as described previously with respect to FIGS. 4-6B.

In FIG. 9, an application may ping the server (step 905), triggering communication between the host device 410 and one or more of the RUs 420. If the LTE communication link is established and available for data transmission (step 910, Yes), the host device 410 may transmit data to the RU 420 via the LTE communication link (step 930).

If the LTE communication link has failed or is otherwise unavailable (step 910, No), the edge server 30 may switch to the MANET communication protocol (step 915) and a MANET communication link may be assessed (step 920). If the MANET communication link is established and available for data transmission (step 920, Yes), the host device 410 may transmit data to the RU 420 via the MANET communication link (step 930). If the MANET communication link has failed or is otherwise unavailable (step 920, No), the edge server 30 may determine if an external communication protocol is attached or established (step 925). For example, the external communication protocol might comprise a satellite communication system and or a VLC (visible light communication) system. If the external communication protocol is attached and the corresponding external communication link is established and available for data transmission (step 925, Yes), the host device 410 may transmit data to the RU 420 via the external communication link (step 930). If the external communication link has failed or is otherwise unavailable (step 925, No), the application may again ping the server (step 905), and the process may begin again.

Although not shown, the multi-modal communication system 200 can include one or more mechanisms and/or devices by which user device 120 can perform the methods as described herein. For example, multi-modal communication system 200 can include one or more encoders and/or decoders, one or more interleavers, one or more circular buffers, one or more multiplexers and/or de-multiplexers, one or more permuters and/or de-permuters, one or more encryption and/or decryption units, one or more modulation and/or demodulation units, one or more arithmetic logic units and/or their constituent parts, etc. These mechanisms and/or devices can include any combination of hardware and/or software components and can be included, in whole or in part, in any of the components shown in the figures.

In one or more example designs of multi-modal communication system 200, the functions described can be implemented in hardware, software, firmware, or any combination thereof. If implemented in software, the functions can be stored as one or more instructions or code on computer-readable medium, including the computer-readable medium described above (e.g., RAM, ROM, storage media, etc.).

While the disclosure has been shown and described with reference to example embodiments thereof, it will be understood that various changes in form and details may be made therein without departing from the spirit of the disclosure.

What is claimed is:

1. A self-contained multi-modal communication system configured to provide communication redundancy and failover between a first self-contained private communication network using a first network modality and a second self-contained private communication network using a second network modality, the system comprising:
 a cellular network core configured to implement the first self-contained private communication network as a private long-term evolution (LTE) cellular communication network separate from public cellular telecommunication networks;
 a cellular base station for providing a wireless cell of the private LTE network, the cellular base station associated with at least a first LTE radio frequency (RF) frontend module for operation at a first RF carrier frequency and a second LTE RF frontend module for operation at a second RF carrier frequency;
 a backhaul wireless transceiver configured to implement the second self-contained private communication network as a non-cellular communication network, wherein the second network modality is different from the first network modality; and
 an automatic failover detection system, wherein the automatic failover detection system is configured to receive as input a plurality of network parameters associated with one or more of the private LTE network or the second self-contained private communication network, and is configured to automatically perform failover and modality switching between the private LTE network and the second self-contained private communication network for one or more communication devices associated with the self-contained multi-modal communication system.

2. The self-contained multi-modal communication system of claim 1, wherein the automatic failover detection system is configured to perform the failover and modality switching based on analyzing one or more network parameters of the plurality of network parameters.

3. The self-contained multi-modal communication system of claim 1, wherein the automatic failover detection system is configured to automatically perform dynamic failover based on switching the one or more communication devices between a first communication modality link associated with the first cellular base station and a second communication modality link associated with the backhaul wireless transceiver.

4. The self-contained multi-modal communication system of claim 1, wherein the automatic failover detection system is further configured to perform failover between the first LTE frontend module with the first RF carrier frequency and the second LTE frontend module with the second RF carrier frequency, wherein the first and second RF carrier frequencies are different.

5. The self-contained multi-modal communication system of claim 1, wherein the automatic failover detection system performs failover and modality switching based on analyzing one or more network parameters of the plurality of network parameters against one or more corresponding threshold values.

6. The self-contained multi-modal communication system of claim 1, wherein the plurality of network parameters received as input to the automatic failover detection system includes one or more of: real-time network traffic, historical network traffic, a signal-to-noise ratio (SNR), a connectivity status, a signal strength, a bandwidth, a latency, a jitter, or a packet loss.

7. The self-contained multi-modal communication system of claim 5, wherein:
a first subset of the plurality of network parameters corresponds to the private LTE network; and
a second subset of the plurality of network parameters corresponds to a backhaul network provided by the backhaul wireless transceiver and comprising the second self-contained private communication network.

8. The self-contained multi-modal communication system of claim 1, wherein the automatic failover detection system automatically performs failover, for a given one of the communication devices, by:
determining that a first communication modality has become unavailable or insufficient, the determination based on the plurality of network parameters;
identifying a second communication modality that is available and sufficient to satisfy one or more operational criteria of the given communication device; and
initiating a failover communication link for the given communication device, wherein the failover communication link is initiated using the identified second communication modality.

9. The self-contained multi-modal communication system of claim 8, wherein:
the first communication modality comprises the private LTE network; and
the second communication modality comprises a mobile ad-hoc network (MANET) network implemented via the backhaul wireless transceiver.

10. The self-contained multi-modal communication system of claim 8, wherein the automatic failover detection system further receives as input the one or more operational criteria of the given communication device, and wherein the one or more operational criteria include at least one of power usage criteria, bandwidth criteria, or security criteria.

11. The self-contained multi-modal communication system of claim 8, wherein the automatic failover detection system further receives as input one or more indications of real-time environmental data corresponding to a surrounding environment of the self-contained multi-modal communication system.

12. The self-contained multi-modal communication system of claim 11, wherein the one or more indications of real-time environmental data include one or more of a GPS location associated with the self-contained multi-modal communication system, topography information of the surrounding environment, detected obstacle information associated with the surrounding environment, line of sight information associated with the surrounding environment, or attenuation map information associated with the surrounding environment.

13. The self-contained multi-modal communication system of claim 1, wherein the system further includes:
an embedded edge cloud compute device comprising an embedded edge server configured to implement the automatic failover detection system.

14. The self-contained multi-modal communication system of claim 13, wherein the embedded edge server further includes at least one virtual machine (VM) implementing an Evolved Packet Core (EPC), wherein the EPC provides the private cellular LTE network and the wireless cell.

15. The self-contained multi-modal communication system of claim 14, wherein the EPC and the cellular network core are the same.

16. The self-contained multi-modal communication system of claim 1, wherein:
the cellular base station includes one or more mobile broadband radios for providing the wireless cell of the private LTE network; and
the cellular base station or the one or more mobile broadband radios can be configured to implement one or more of a 2G, 3G, 4G LTE, or 5G telecommunication protocol.

17. The self-contained multi-modal communication system of claim 1, wherein the cellular network core, the cellular base station, the backhaul wireless transceiver, and the automatic failover detection system are disposed within a portable housing, and wherein the wireless cell of the private LTE network is centered about the portable housing.

18. The self-contained multi-modal communication system of claim 17, wherein the portable housing further includes one or more batteries for powering the self-contained multi-modal communication system.

19. The self-contained multi-modal communication system of claim 16, wherein:
each respective mobile broadband radio of the one or more mobile broadband radios is associated with a particular carrier frequency range; and
each respective mobile broadband radio provides the private LTE network via an LTE band corresponding to the particular carrier frequency range associated with the respective mobile broadband radio.

20. The self-contained multi-modal communication system of claim 1, wherein the backhaul wireless transceiver comprises an integrated mobile ad-hoc network (MANET) transceiver.

* * * * *